US011916293B2

(12) United States Patent
Hwang et al.

(10) Patent No.: US 11,916,293 B2
(45) Date of Patent: Feb. 27, 2024

(54) ANTENNA STRUCTURE AND WIRELESS COMMUNICATION DEVICE

(71) Applicant: DELTA ELECTRONICS, INC., Taoyuan (TW)

(72) Inventors: Chieh-Tsao Hwang, Taoyuan (TW); Siang-Rong Hsu, Taoyuan (TW); Yen-Ting Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 18 days.

(21) Appl. No.: 17/450,556

(22) Filed: Oct. 11, 2021

(65) Prior Publication Data

US 2022/0336958 A1 Oct. 20, 2022

(30) Foreign Application Priority Data

Apr. 16, 2021 (CN) ......................... 202110411522.0

(51) Int. Cl.
*H01Q 13/10* (2006.01)
*H01Q 1/48* (2006.01)

(52) U.S. Cl.
CPC ............... *H01Q 13/10* (2013.01); *H01Q 1/48* (2013.01)

(58) Field of Classification Search
CPC ...... H01Q 13/10; H01Q 13/106; H01Q 21/08; H01Q 1/38
See application file for complete search history.

(56) References Cited

U.S. PATENT DOCUMENTS

| | | | | |
|---|---|---|---|---|
| 8,405,553 B2 * | 3/2013 | Pintos | H01Q 1/243 343/700 MS |
| 10,873,124 B2 | 12/2020 | Chen et al. | |
| 2015/0263430 A1 * | 9/2015 | Lin | H01Q 5/40 343/767 |

(Continued)

FOREIGN PATENT DOCUMENTS

| | | |
|---|---|---|
| CN | 110635229 A | 12/2019 |
| EP | 2224539 A1 | 9/2010 |

(Continued)

OTHER PUBLICATIONS

Ramesh et al. "Design and Analysis of Dual Band MIMO Antenna System for GPS and IoT Wireless Applications", Intl. Journal of Innovative and Exploring Engineering, Mar. 2019 (Year: 2019).*

(Continued)

*Primary Examiner* — Ricardo I Magallanes
(74) *Attorney, Agent, or Firm* — CKC & Partners Co., LLC

(57) ABSTRACT

An antenna structure is provided, which includes a substrate, an antenna unit and a metal ground. The substrate includes a first surface and a second surface; the antenna unit disposed on the first surface includes a radiation part, a feeding part and a feeding line, where the feeding line includes a first transmission line and a second transmission line that are perpendicular to each other and connected to each other, and the first transmission line is connected to the radiation part via the feeding part; and the metal ground disposed on the second surface has an edge which is perpendicular to projection of the radiation part to the metal ground; and a resonance slot is disposed on the metal ground, and its position corresponds between projection of the second transmission line to the metal ground and the edge.

4 Claims, 7 Drawing Sheets

(56) References Cited

U.S. PATENT DOCUMENTS

2019/0123429 A1 4/2019 Ramaci

FOREIGN PATENT DOCUMENTS

| | | | | | |
|---|---|---|---|---|---|
| JP | 2006115182 | A | * | 4/2006 | ............. H01Q 13/10 |
| JP | 2006115182 | A | | 4/2006 | |
| JP | 2010206795 | A | | 9/2010 | |
| TW | 201236268 | A | | 9/2012 | |
| TW | 594496 | B | | 8/2017 | |
| TW | 201902032 | A | | 1/2019 | |

OTHER PUBLICATIONS

Ramesh R. et al: "Design and Analysis of Dual Band MIMO Antenna System for GPS and IoT Wireless Applications", Internatonal Journal of Innovative Technology and Exploring Engineering (IJITEE), vol. 8, No. 5, Mar. 10, 2019, pp. 1183-1189.

Fauzi Siti Munirah et al: "Bandwidth enhancement technique using ground slot for ultra-wideband Coplanar Inverted-F Antenna," 2013 IEEE International RF and Microwave Conference (RFM), IEEE, Dec. 9, 2013, pp. 322-324.

* cited by examiner

ANTENNA STRUCTURE AND WIRELESS COMMUNICATION DEVICE

CROSS-REFERENCE TO RELATED APPLICATION

This application claims priority to China Application Serial Number 202110411522.0, filed Apr. 16, 2021, which is herein incorporated by reference in its entirety.

BACKGROUND

Field of Disclosure

The present disclosure relates to an antenna structure and wireless communication device.

Description of Related Art

Generally, in order to fulfill great demand of 5G new radio (5G NR) standard in sub-7 GHz frequency band, antennas need to be further designed to handle the high operating bandwidth and high isolation between the antennas, thereby obtaining high data rate and high throughput of multi-input multi-output (MIMO) systems.

In systems prior to the 5G NR standard, the operating frequency band of the antenna is usually relatively small. By a general antenna design, this bandwidth requirement can be fulfilled. However, such antenna designs often cannot meet the high operating bandwidth and the high isolation between the antennas. Therefore, how to design the antenna that fulfills the high operating bandwidth and the high isolation between the antennas based on the 5G NR standard is a problem that those skilled in the art are eager to solve.

SUMMARY

The disclosure provides an antenna structure, which includes a substrate, an antenna unit and a metal ground. The substrate includes a first surface and a second surface. The antenna unit is disposed on the first surface, and comprising a radiation part, a feeding part and a feeding line, where the feeding line includes a first transmission line and a second transmission line that are perpendicular to each other and connected to each other, and the first transmission line is connected to the radiation part via the feeding part. The metal ground is disposed on the second surface, where the metal ground has an edge which is perpendicular to projection of the radiation part toward the metal ground, and a resonance slot is disposed on the metal ground, and which position corresponds between projection of the first transmission line toward the metal ground and the edge.

The disclosure provides a wireless communication device which includes a substrate, at least two antenna units and at least one metal ground. The substrate includes a first surface and a second surface. The at least two antenna units is disposed on the first surface, and adjacent two of which are perpendicular to each other, where the at least two antenna units includes at least two radiation parts, at least two feeding parts and at least two feeding lines, and each of the at least two feeding lines includes a first transmission line and a second transmission line that are perpendicular and connected to each other, where the first transmission lines of the at least two feeding lines are respectively connected to the at least two radiation parts via the at least two feeding parts. The at least one metal ground is disposed on the second surface, where at least one isolation slot is disposed on the at least one metal ground, and which position respectively corresponds between projections of the adjacent two of the at least two antenna units toward the at least one metal ground, the at least one metal ground has at least two edges, wherein adjacent two of the at least two edges are perpendicular to each other, and the at least two edges are respectively perpendicular to projection of the at least two radiation parts toward the metal ground, and at least two resonance slots are disposed on the at least one metal ground, and which position corresponds between projection of the second transmission line of the at least two feeding lines toward the metal ground and the corresponding one of the at least two edges.

Based on the above, the wireless communication device provided by the present disclosure can greatly increase operating bandwidth of an antenna by the resonance slot of the metal ground. In addition, isolation between antennas can be further increased by designing position of the isolation slot and vertical antenna unit.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
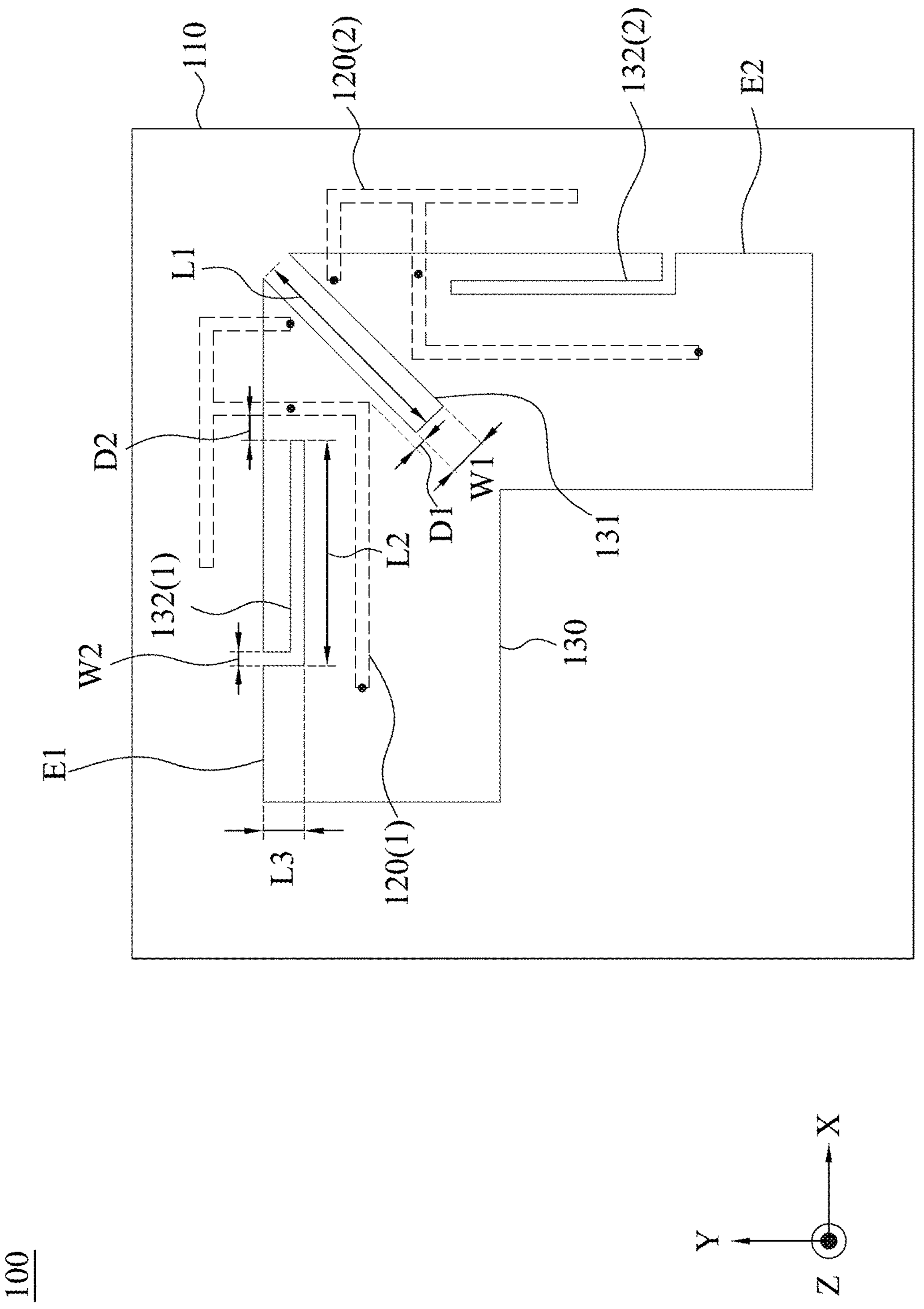
FIG. 1 is a bottom perspective view illustrating a wireless communication device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
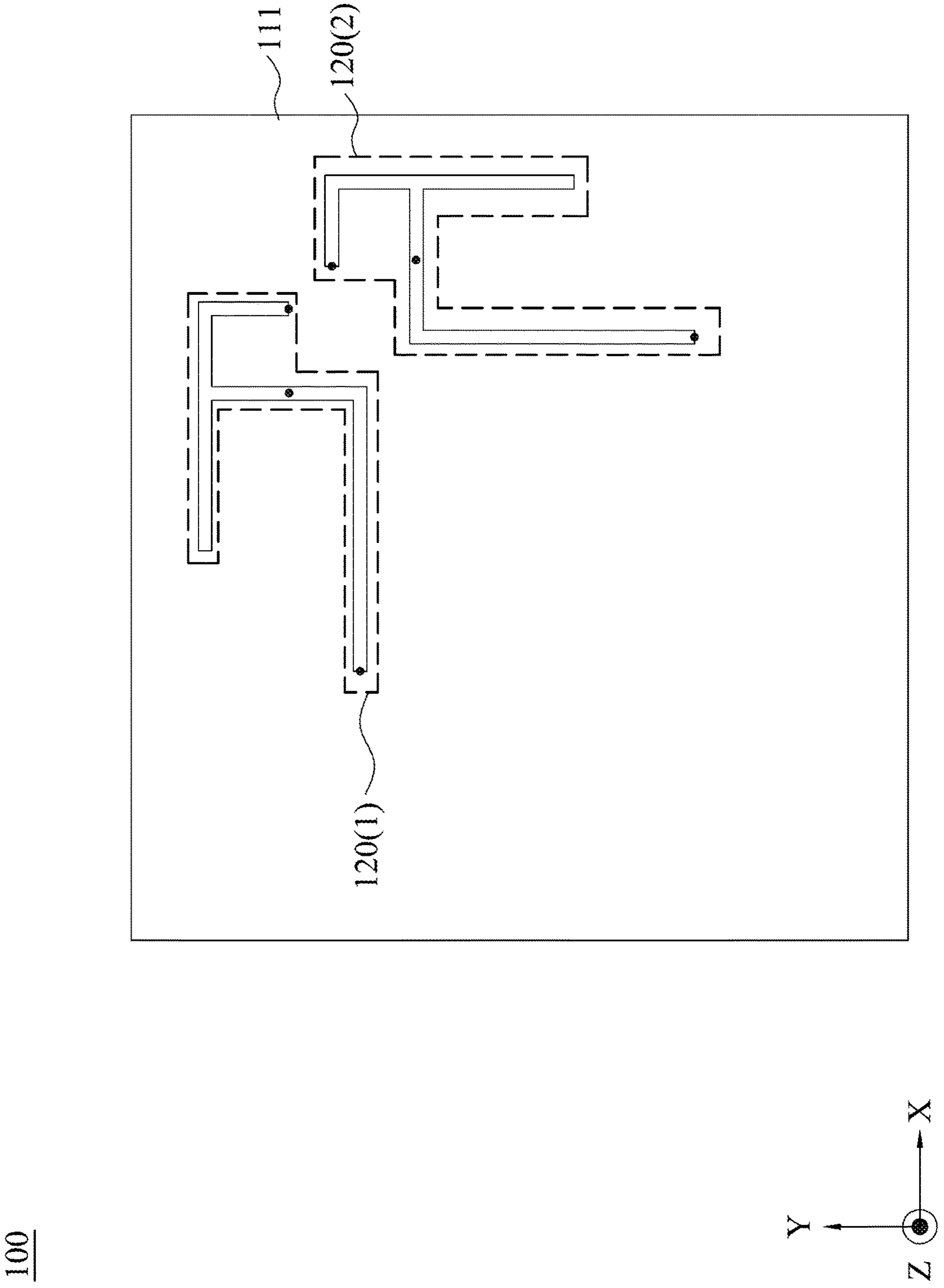
FIG. 2 is a top view of the wireless communication device according to an embodiment of the disclosure.
Figure 3:
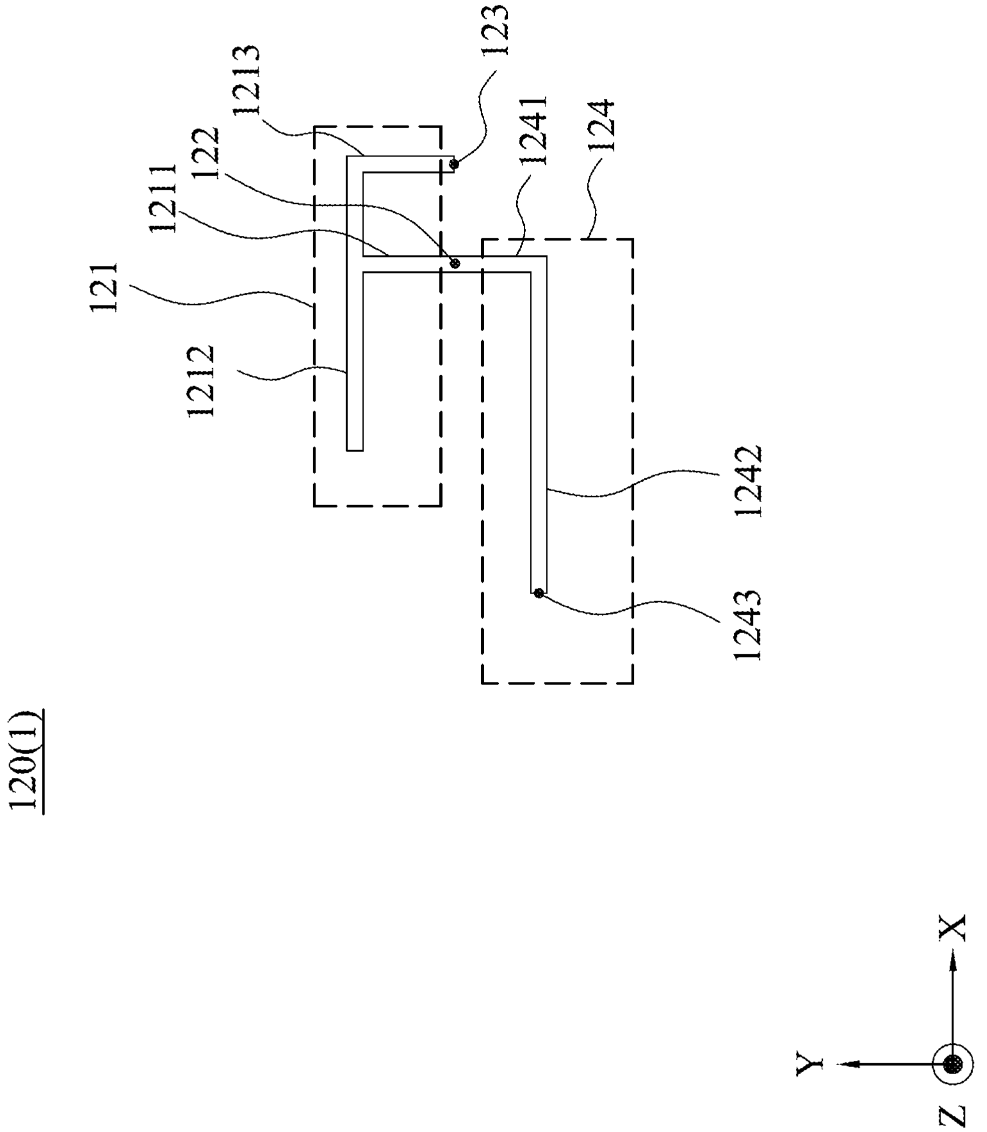
FIG. 3 is a top view of an antenna unit in the wireless communication device according to an embodiment of the disclosure.
Figure 4:
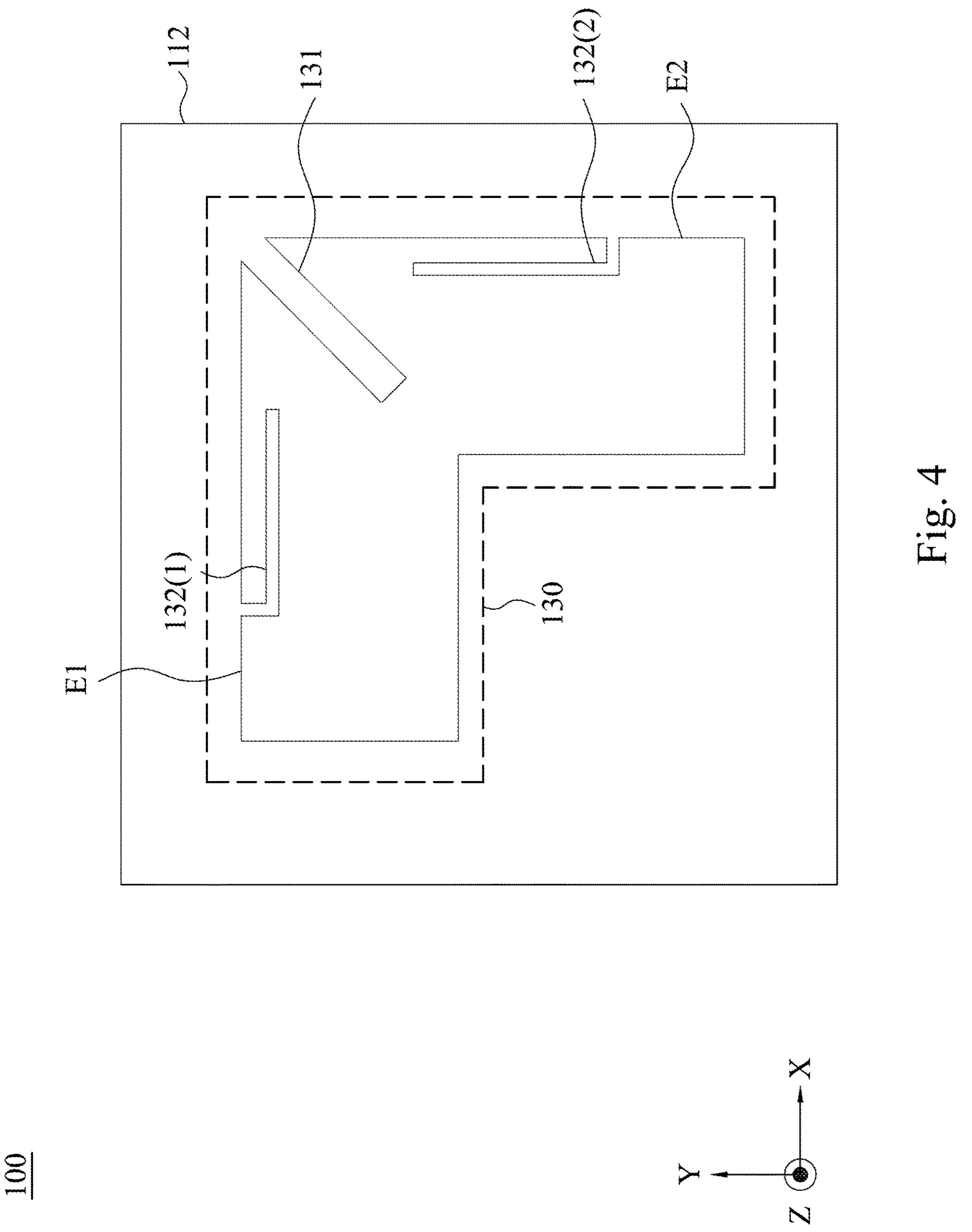
FIG. 4 is a bottom view of the wireless communication device according to an embodiment of the disclosure.

FIG. 1 is a bottom perspective view illustrating a wireless communication device 100 according to an embodiment of the disclosure. FIG. 2 is a top view of the wireless communication device 100 according to an embodiment of the disclosure. FIG. 3 is a top view of an antenna unit in the wireless communication device 100 according to an embodiment of the disclosure. FIG. 4 is a bottom view of the wireless communication device 100 according to an embodiment of the disclosure. Referring to FIGS. 1 to 4 at the same time, a wireless communication device 100 includes a substrate 110, a pair of antenna units 120(1) to 120(2), and a metal ground 130.

It is worth noting that although number of antenna units 120(1) to 120(2) in this embodiment is 2 and number of metal ground 130 is 1, the number of antenna units 120(1) to 120(2) can also be a positive even number more than 2 and the number of metal ground 130 can also be a positive integer more than 1. In addition, the number of antenna units 120(1) to 120(2) is twice the number of metal ground 130.

Figure 5:
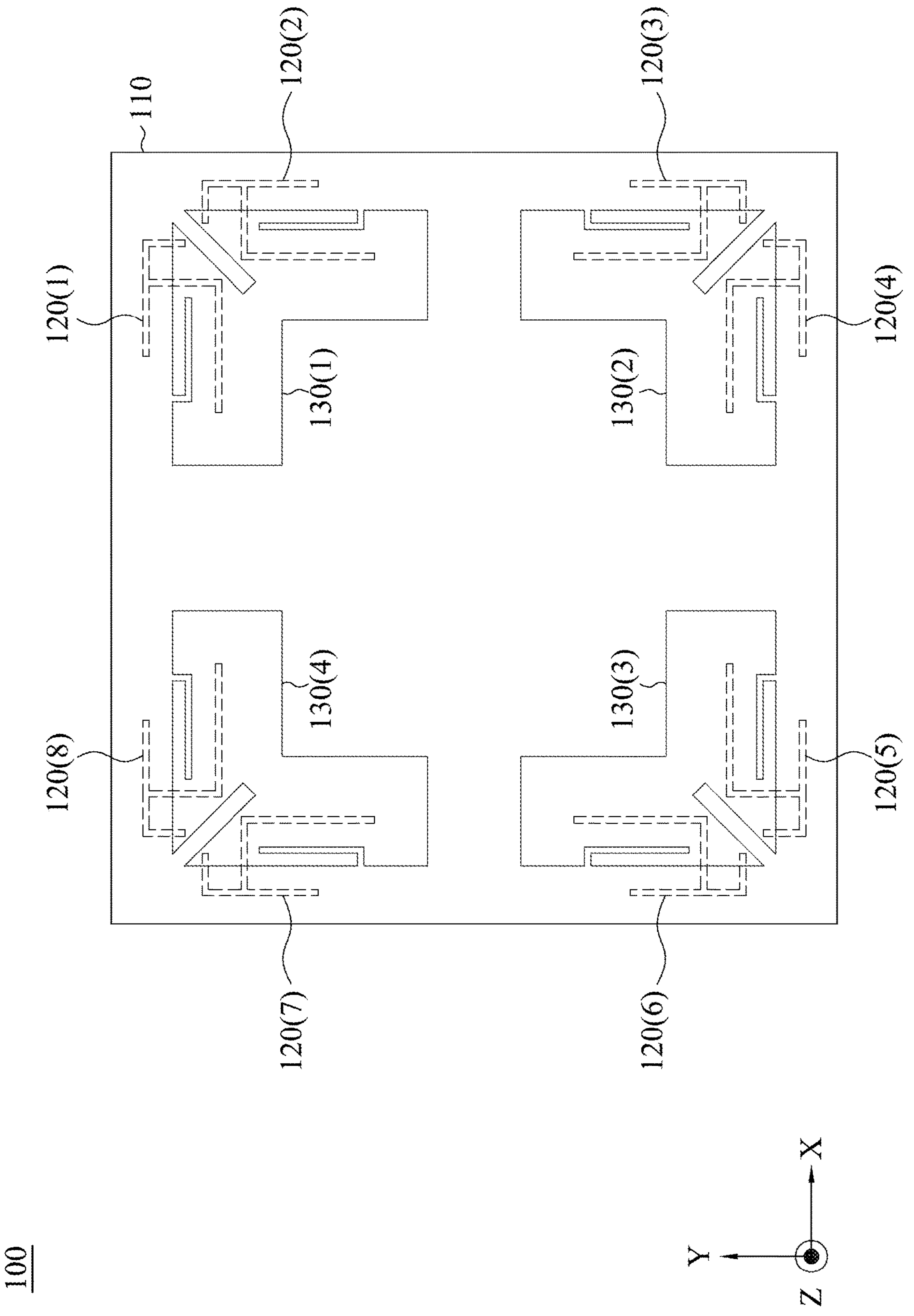
FIG. 5 is a bottom perspective view of the wireless communication device according to another embodiment of the disclosure.

For example, FIG. 5 is a bottom perspective view of the wireless communication device according to another embodiment of the disclosure. Referring to FIG. 5, this embodiment shows an example of one substrate 110, eight antenna units 120(1) to 120(8), and four metal ground 130(1) to 130(4).

Furthermore, referring back to FIGS. 1 to 4 at the same time, the substrate 110 includes a first surface 111 and a second surface 112 corresponding to each other, where the first surface 111 is shown in FIG. 2, and the second surface 112 is shown in FIG. 4. The antenna units 120(1) to 120(2) are disposed on the first surface 111, and the metal ground 130 is disposed on the second surface 112. In addition, FIG. 3 further illustrates the detailed structure of the antenna unit 120(1).

In some embodiments, the substrate 110 is a printed circuit board (PCB) made of an insulating material, where material of the substrate 110 is Teflon (PTFE) or epoxy resin (FR4), which is commonly used to manufacture PCBs. In this way, the antenna units 120(1) to 120(2) can be directly printed on the substrate 110.

The antenna units 120(1) to 120(2) is perpendicular to each other, and the antenna unit 120(1) includes a radiation part 121, a feeding part 122, a ground via 123 and a feeding line 124, where the feeding line 124 includes a first transmission line 1241 and a second transmission line 1242 that are perpendicular to each other and connected to each other, and the first transmission line 1241 is connected to the radiation part 121 via the feeding part 122.

In addition, the feeding line 124 further includes a feeding point 1243, and the antenna unit 120(1) receives feeding signal from signal source through the feeding point 1243.

It is worth noting that the antenna unit 120(2) also have the same structure as the antenna unit 120(1), therefore, it will not be repeated here.

By the above-mentioned disposing method of the antenna units 120(1) to 120(2), polarization direction of the antenna unit 120(1) is y direction, and polarization direction of the antenna unit 120(2) is x direction. Accordingly, isolation of the antenna units 120(1) to 120(2) can be greatly improved (e.g., the isolation can be reduced to about −10 dB).

In some embodiments, the antenna units 120(1) to 120(2) all can be planar inverted-F antennas (PIFA) with an inverted F shape. In addition, the antenna units 120(1) to 120(2) also can be other types of antennas (e.g., monopole antennas) having the above-mentioned feeding line structure, and the antenna units 120(1) to 120(2) can also be different types of antennas with the above-mentioned feeding line structure (e.g., the antenna unit 120(1) is a PIFA antenna, and the antenna unit 120(2) is a monopole antenna). There are no other restrictions on the types of antenna units 120(1) to 120(2).

In some embodiments, if the antenna units 120(1) to 120(2) are all PIFA antennas, the radiation part 121 of the antenna unit 120(1) includes a first radiation part 1211, a second radiation part 1212, and a third radiation part 1213, where the third radiation part 1213 is L shape.

In addition, a first terminal of the first radiation part 1211 is connected between the second radiation part 1212 and the third radiation part 1213, and the second terminal of the first radiation part 1211 is connected to the feeding part 122. Other, the third radiation part 1213 is connected to the ground via 123, and the ground via 123 is connected to the metal ground 130.

In some embodiments, the metal ground 130 is an inverted L shape, and the metal ground 130 is made of a metal material such as copper foil, etc.

Furthermore, the isolation slot 131 of the metal ground 130 is disposed on the metal ground 130, and its position respectively corresponds between projections of the antenna units 120(1) to 120(2) toward the metal ground 130, where number of isolation slots 131 is equal to the number of the metal ground 130.

In some embodiments, the isolation slot 131 is rectangular, and distance D1 between the isolation slot 131 and the projection of the antenna unit 120(1) to 120(2) toward the metal ground 130 is more than 1 mm. In addition, width W1 of the isolation slot 131 is 3.6 mm, and length L1 of the isolation slot 131 is a quarter wavelength of center frequency of an operating frequency band of the antenna units 120(1) to 120(2).

In detail, the wavelength of the center frequency of the operating frequency band of the antenna units 120(1) to 120(2) is affected by the material of the substrate 110 (i.e., different materials correspond to different wavelengths).

In other words, the wavelength of the center frequency of the operating frequency band of the antenna unit 120(1) to 120(2) is mainly related to the effective dielectric constant (Dkeff) of the material of the substrate 110 (i.e., approximately value obtained by adding 1 to a dielectric constant (Dk) and dividing by 2). For example, the dielectric constant of Teflon is 3.0 to 4.5, and the dielectric constant of FR4 is 3.5.

Further, an equivalent value is obtained from square root of the above-mentioned effective dielectric constant, and the wavelength of the center frequency of the operating frequency band of the antenna unit 120(1) to 120(2) is inversely proportional to the equivalent value.

By the above-mentioned disposing of the isolation slot 131, the antenna unit 120(1) to 120(2) will resonate with the isolation slot 131 to block the signal generated by the antenna unit 120(1) to 120(2), thereby greatly increasing the isolation of the antenna unit 120(1) to 120(2) (i.e., the isolation is further reduced to below −20 dB).

Figure 6:
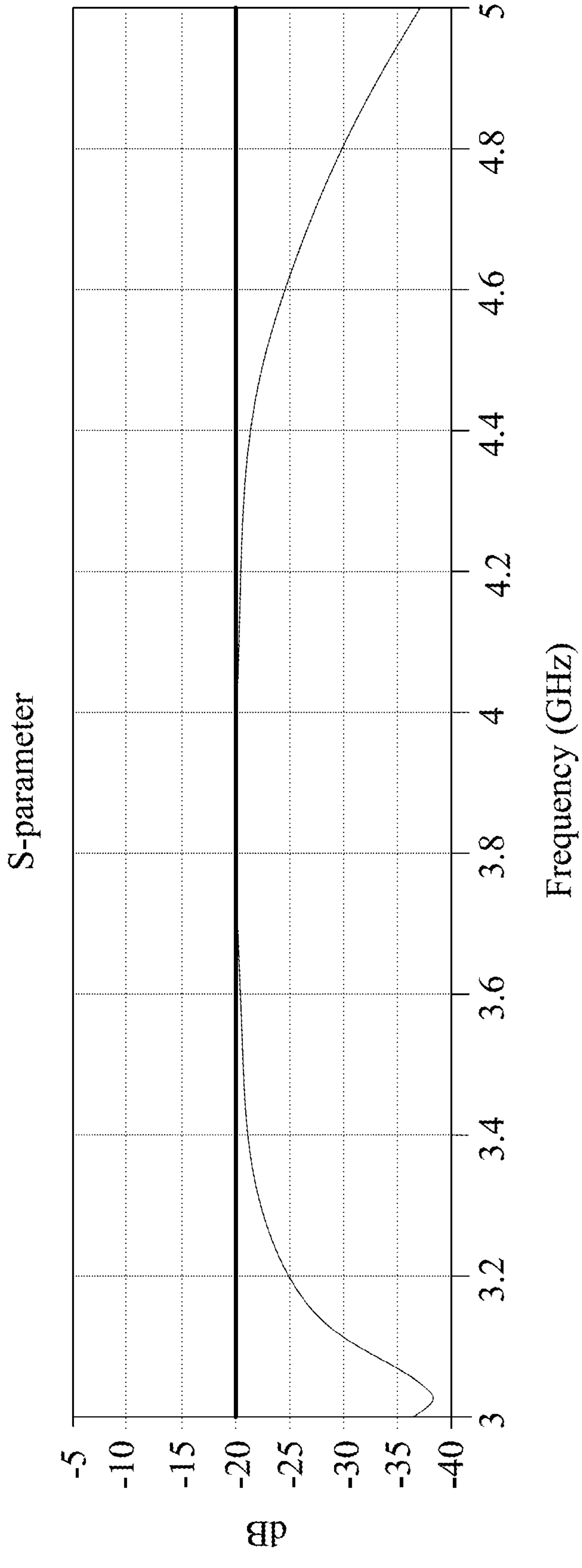
FIG. 6 is an s-parameter of isolation and frequency of two antenna units according to another embodiment of the disclosure.

FIG. 6 is an s-parameter of isolation and frequency of two antenna units according to another embodiment of the disclosure. Referring to FIGS. 1 and 6 at the same time, by the above-mentioned disposing of the isolation slot 131, the isolation of the antenna units 120(1) to 120(2) is obviously reduced to below −20 dB. In other words, the isolation of the antenna units 120(1) to 120(2) can fulfill isolation requirement of the 5G new radio (5G NR) standard (i.e., less than −20 dB).

Furthermore, referring back to FIGS. 1 to 4 at the same time, the metal ground 130 has edges E1 to E2, where the edges E1 to E2 is perpendicular to each other, and the edges E1 to E2 is perpendicular to projections of the radiating parts of the antenna units 120(1) to 120(2) toward the metal ground 130, respectively.

In other words, the edge E1 is perpendicular to projection of a part of the radiation part 121 nearby the feeding part 122 toward the metal ground 130. Similarly, the edge E2 also can be disposed in a similar manner.

In some embodiments, length of the edges E1 to E2 is a half wavelength of the center frequency of the operating frequency band of the antenna units 120(1) to 120(2).

Furthermore, the resonance slots 132(1) to 132(2) are disposed on the metal ground 130, and their positions correspond to projection of second transmission lines of the feeding lines in the antenna units 120(1) to 120(2) toward the metal ground 130 and the corresponding one of the edges E1 to E2.

In other words, the position of the resonance slot 132(1) is between the projection of the second transmission line 1242 of the feeding line 124 toward the metal ground 130 and the edge E1. Similarly, the position of the resonance slot 132(2) also can be disposed in a similar manner.

In some embodiments, shape of the resonance slots 132(1) to 132(2) is L shape, and length of the resonance slot 132(1) to 132(2) (i.e., sum of length L2 and the length L3) is the quarter wavelength of the center frequency of the operating frequency band of the antenna units 120(1) to 120(2).

In some embodiments, width W2 of the resonance slot 132(1) to 132(2) is 1 mm, and distance D2 between the resonance slots 132(1) to 132(2) and projections of the antenna units 120(1) to 120(2) toward the metal ground 130 is more than 1 mm.

In other words, the distance D2 between the resonance slot 132(1) and the projection of the feeding part 122 of the antenna unit 120(1) toward the metal ground 130 is more than 1 mm. Similarly, the resonance slot 132(2) also can be disposed in a similar manner.

In some embodiments, the radiation parts of the antenna units 120(1) to 120(2) (e.g., the radiation part 121 of the antenna unit 120(1)) resonate by themselves to generate a first resonance frequency band, and the resonance slots 132(1) to 132(2) respectively resonate with the radiation parts of the antenna units 120(1) to 120(2) to generate a second resonance frequency band adjacent to the first resonance frequency band, where the operating frequency bands of the antenna units 120(1) to 120(2) includes the first resonance frequency band and the second resonance frequency band.

By the above-mentioned disposing of the resonance slots 132(1) to 132(2), the operating frequency band of the antenna units 120(1) to 120(2) is greatly increased.

Figure 7:
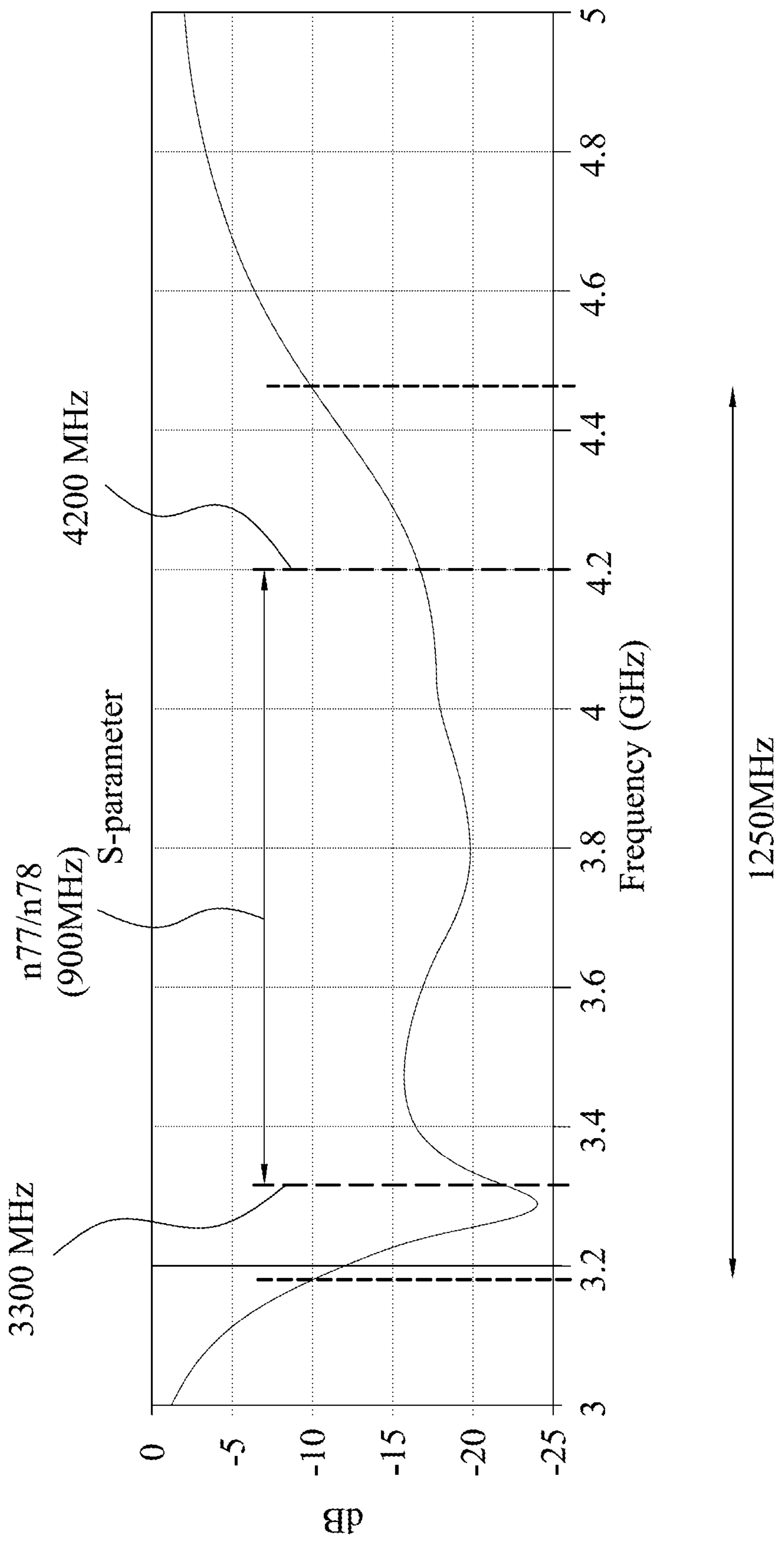
FIG. 7 is an s-parameter (return loss) of operating frequency bands of the two antenna units according to another embodiment of the disclosure.

FIG. 7 is an s-parameter (return loss) of operating frequency bands of the two antenna units according to another embodiment of the disclosure. Referring to FIGS. 1 to 7 at the same time, frequency band n77/n78 of the general fifth-generation new radio (5G NR) standard is 3.3 GHz to 4.2 GHz (bandwidth is 900 MHz). By the above-mentioned disposing of the resonance slots 132(1) to 132(2), the operating frequency band of the antenna units 120(1) to 120(2) is 3.19 GHz to 4.46 GHz (return loss is less than −10 dB). In other words, the operating frequency bands of the antenna units 120(1) to 120(2) can simultaneously fulfill the frequency bands n77/n78 of the 5G NR standard.

Accordingly, referring back to FIGS. 1 to 4 at the same time, the antenna unit 120(1), the resonance slot 132(1), a part of the substrate 110 and a part of the metal ground 130 (the part of the substrate 110 and the part of the metal ground 130 correspond to the antenna unit 120(1) and the resonance slot 132(1)) can form a resonance structure. Similarly, the antenna unit 120(2), the resonance slot 132(2), another part of the substrate 110, and another part of the metal ground 130 (The other part of the substrate 110 and the other part of the metal ground 130 correspond to the antenna unit 120(2) and the resonance slot 132(2)) can also form another resonance structure.

Based on the above, by the above-mentioned wireless communication device 100, the above-mentioned antenna structure can be used to further fulfill the high operating bandwidth of the 5G NR standard and the high isolation of the antenna unit in the sub-7 GHz frequency band.

In summary, the wireless communication device provided by the present disclosure utilizes the isolation slots between adjacent antenna units and the vertical disposing of the antenna units to greatly increase the isolation of the antenna units. In addition, the wireless communication device provided by the present disclosure further utilizes the resonance slot of the feeding line adjacent to the antenna unit, which greatly increases the operating bandwidth of the antenna unit. Accordingly, it can fulfill the high operating bandwidth of the 5G NR standard and the high isolation of the antenna unit in the sub-7 GHz frequency band.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless communication device, comprising:

a substrate, comprising a first surface and a second surface;

at least two antenna units, disposed on the first surface, positioned adjacent and perpendicular to each other, wherein the at least two antenna units comprises at least two radiation parts, at least two feeding parts and at least two feeding lines, and the at least two radiation parts comprises a first radiation part, a second radiation part, a third radiation part, and each of the at least two feeding lines includes a first transmission line and a second transmission line that are perpendicular and connected to each other, wherein the first transmission lines of the at least two feeding lines are respectively connected to the at least two radiation parts via the at least two feeding parts; and at least one metal ground, disposed on the second surface, wherein at least one isolation slot is disposed on the at least one metal ground, and which position respectively corresponds between projections of the adjacent two of the at least two antenna units toward the at least one metal ground, the at least one metal ground has at least two edges, wherein adjacent two of the at least two edges are perpendicular to each other, one of the adjacent two of the at least two edges is perpendicular to projections of the first radiation part and the third radiation part toward the at least one metal ground, and the other one of the adjacent two of the at least two edges is perpendicular to projection of the second radiation part toward the at least one metal ground, and at least two resonance slots are disposed on the at least one metal ground, and which position corresponds between projection of the second transmission line of the at least two feeding lines toward the metal ground and the corresponding one of the at least two edges, wherein the at least one isolation slot is rectangular, and shape of the at least two resonance slots is L shape, wherein length of the at least one isolation slot and length of the at least two resonance slots are a quarter wavelength of the center frequency of an operating frequency band of the at least two antenna units, and length of the at least two edges are a half wavelength of the center frequency of the operating frequency band of the at least two antenna units.

2. The wireless communication device of claim 1, wherein width of the at least one isolation slot is 3.6 mm, and width of the at least two resonance slots is 1 mm, wherein distance between the at least one isolation slot and projection of adjacent two of the at least two antenna units toward the metal ground is more than 1 mm.

3. The wireless communication device of claim 1, wherein the at least two radiation parts resonate by themselves to generate a first resonance frequency band, and the at least two resonance slots respectively resonate with the at least two radiation parts to generate a second resonance frequency band adjacent to the first resonance frequency band.

4. The wireless communication device of claim 1, wherein the at least two radiation parts are inverted F shape, and the at least two feeding lines are L shape, wherein the at least one isolation slot blocks signal transmission between the at least two antenna units to increase isolation of the at least two antenna units.

* * * * *